US011810351B2

(12) United States Patent
Debnath et al.

(10) Patent No.: US 11,810,351 B2
(45) Date of Patent: Nov. 7, 2023

(54) VIDEO ANALYTIC PROCESSING WITH NEURO-SYMBOLIC ARTIFICIAL INTELLIGENCE

(71) Applicant: NEC Laboratories America, Inc., Princeton, NJ (US)

(72) Inventors: Biplob Debnath, Princeton, NJ (US); Srimat Chakradhar, Manalapan, NJ (US); Yi Yang, Princeton, NJ (US); Neisarg Dave, State College, PA (US)

(73) Assignee: NEC Corporation

( * ) Notice: Subject to any disclaimer, the term of this patent is extended or adjusted under 35 U.S.C. 154(b) by 215 days.

(21) Appl. No.: 17/497,246

(22) Filed: Oct. 8, 2021

(65) Prior Publication Data

US 2022/0114369 A1 Apr. 14, 2022

Related U.S. Application Data (60) Provisional application No. 63/090,301, filed on Oct. 12, 2020.

(51) Int. Cl.
*G06V 20/40* (2022.01)
*G06T 7/20* (2017.01)
*G06N 3/02* (2006.01)

(52) U.S. Cl.
CPC ............ *G06V 20/41* (2022.01); *G06N 3/02* (2013.01); *G06T 7/20* (2013.01); *G06V 20/49* (2022.01);

(Continued)

(58) Field of Classification Search
CPC .......... G06N 3/045; G06N 3/08; G06N 3/084; G06N 5/046; G06N 5/04; G06N 3/04;
(Continued)

(56) References Cited

U.S. PATENT DOCUMENTS

| 9,529,824 B2 * | 12/2016 | Tusk ................... G06F 16/5838 |
| 2019/0171986 A1 * | 6/2019 | Beznos .............. G06Q 10/0635 |
| 2020/0302232 A1 * | 9/2020 | Kilickaya ............ G06V 10/273 |

OTHER PUBLICATIONS

Yi et al., "CLEVRER: Collision Events for Video Representation and Reasoning", arXiv preprint arXiv:1910.01442. Oct. 3, 2019., pp. 1-19.

(Continued)

*Primary Examiner* — Quan M Hua
(74) *Attorney, Agent, or Firm* — Joseph Kolodka (57) ABSTRACT

Systems and methods for video analytic processing with neuro-symbolic artificial intelligence are provided. These systems and methods include detecting and extracting one or more objects from one or more video frames, and identifying the attributes associated with each of the one or more objects. These further include extracting context from a question, and compiling a series of inquiries to identify the information needed to answer the question and identify missing information. These further include storing intermediate information about the extracted objects and identified attributes, and determining whether the question requires further modeling of data to obtain missing information. These further include mining the one or more video frames for missing information, and compiling the intermediate information from the data storage and missing information based on the context of the question to produce a final answer.

20 Claims, 8 Drawing Sheets

(52) U.S. Cl.
CPC ............... *G06T 2207/10016* (2013.01); *G06T 2207/20081* (2013.01); *G06T 2207/20084* (2013.01)

(58) Field of Classification Search
CPC . G06T 2207/20081; G06T 2207/20084; G06T 2207/10016; G06T 7/11; G06T 7/10; G06T 2207/20016; G06T 2207/10024; G06T 2207/10028; G06T 2207/10081; G06T 2207/10088; G06T 7/143; G06T 2207/10104; G06T 2207/20104; G06T 7/55; G06V 20/46; G06V 20/49; G06V 10/82; G06V 10/454; G06V 10/267; G06V 10/26; G06V 10/25; G06V 10/764; G06V 20/41; G06V 10/94; G06V 10/255; G06V 20/52; H04N 21/23418; H04N 21/44008; H04N 19/136; H04N 19/179
See application file for complete search history.

(56) References Cited

OTHER PUBLICATIONS

Tingwu Wang, "Semantic Segmentation", Machine Learning Group, University of Toronto, https://www.cs.toronto.edu/~tingwuwang/semantic_segmentation.pdf, 2017, pp. 1-28.

\* cited by examiner

VIDEO ANALYTIC PROCESSING WITH NEURO-SYMBOLIC ARTIFICIAL INTELLIGENCE

RELATED APPLICATION INFORMATION

This application claims priority to Provisional Application No. 63/090,301 filed on Oct. 12, 2020, which is incorporated herein by reference in its entirety.

BACKGROUND

Technical Field

The present invention relates to neural network-based video analysis and querying and more particularly to video analytics query processing with neuro-symbolic artificial intelligence.

Description of the Related Art

Neural networks have been utilized to analyze patterns in digital images and videos, where the neural network can be trained to identify objects and identify attributes. The problem of complex visual reasoning also has been studied in artificial intelligence and computer vision. The models that have been developed have not performed particularly well with causal relationships.

SUMMARY

According to an aspect of the present invention, a method is provided for video analytic processing with neuro-symbolic artificial intelligence. The method includes detecting and extracting one or more objects from one or more video frames, and identifying the attributes associated with each of the one or more objects. The method further includes extracting context from a question, and compiling a series of inquiries to identify the information needed to answer the question and identify missing information. The method further includes storing intermediate information about the extracted objects and identified attributes, and determining whether the question requires further modeling of data to obtain missing information. The method further includes mining the one or more video frames for missing information, and compiling the intermediate information from the data storage and missing information based on the context of the question to produce a final answer.

According to another aspect of the present invention, a system is provided for video analytic processing with neuro-symbolic artificial intelligence. The system includes one or more processors and computer memory. The system further includes a video parser configured to detect and extract one or more objects from one or more video frames and identify the attributes associated with each of the one or more objects, and a query parser that includes a collection of algorithms configured to extract context from a question and compile a series of inquiries to identify the information needed to answer the question and identify missing information. The system further includes data storage configured to store intermediate information about the extracted objects and identified attributes, and a question classifier that is a binary classifier configured to determine whether the question requires further modeling of data to obtain missing information. The system further includes a missing data generator configured to mine the one or more video frames for missing information, and an answer initiator configured to compile the intermediate information from the data storage and missing information from the missing data generator, based on the context of the question from the query parser, and execute a series of programs to produce a final answer.

According to yet another aspect of the present invention, a computer program product is provided for video analytic processing with neuro-symbolic artificial intelligence. The computer program product includes program instructions to detect and extract one or more objects from one or more video frames, program instructions to identify the attributes associated with each of the one or more objects, program instructions to extract context from a question, program instructions to compile a series of inquiries to identify the information needed to answer the question and identify missing information, program instructions to store intermediate information about the extracted objects and identified attributes, program instructions to determine whether the question requires further modeling of data to obtain missing information, program instructions to mine the one or more video frames for missing information, and program instructions to compile the intermediate information from the data storage and missing information based on the context of the question to produce a final answer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

According to an aspect of the present invention, a system and method are provided which augments the traditional video analytic query pipeline with a neural-network based engine, which can model the flow of individual object/agent information, attributes, and relationship between different objects/agents across the video frames. The system and method can understand the dynamics of the environment, and with the neural network-based engine, can generate missing information related to a user's query and can even answer queries which could not be simply answered from the information generated by perception-based networks.

In one or more embodiments, user questions can include, but are not limited to considering a scenario other than the one seen in the video, and answering questions about the events that have not happened yet but may happen beyond the time period and last frame of the video. In various embodiments, an event can be an object appearing in the video, leaving the video, or interacting with another object in the video. An event can have a causation and an outcome. The answer to the question can be based on the temporal and causal structures behind videos of objects in motion and interacting.

According to an aspect of the present invention, a Video Analytic Query Processing system can take video input from a streaming source and questions from a user interface. A Video Parser can parse the objects/agents attribute information and relationships from the video frames and save them in a data store. Given a user question a Query Parser can parse the question into context and program sequences to generate an answer. The Video Parser and Query Parser can each include deep neural network architectures. The context and program sequences can in turn either be pre-defined program functions or a collection of deep neural networks. An Answer Generator can take both sets of information and determine if the stored data is sufficient enough to predict the answer. If current data is not sufficient, the Answer Generator can invoke another neural-network based engine to generate the missing data. The Answer Generator can generate an answer by applying program sequences (e.g., search algorithm) on the stored data and the newly generated missing data, where the program sequences (e.g., search algorithm) can be a series of determinations that identifies the available and requested information through increasingly specific searches. For example, an object inquiry that determined whether an object asked about in a question is present in the video frames, whether an attribute specified in the question is associated with the particular object, whether the particular object undergoes an event or interaction specified in the question, etc.

According to an aspect of the present invention, a system and method are provided having an architecture that combines the traditional Video Query Processing Pipeline with the new data modeler and has the capability to choose the information needed to answer a question, thereby reducing computational overhead. An Answer Predictor module can implement a Data Store, a Question Classifier, a Missing Data Generator and Answer Computation Units. The Missing Data Generator itself can be a hybrid system of collection of neural networks connected via recurrence connections to model flow of information across video frames. An Answer Computation unit can take care of the time stamp of the question, the actual time look back required, the amount of information needed to answer the question and finally running the appropriate programs and deep neural networks to get the final answer.

It is to be understood that aspects of the present invention will be described in terms of a given illustrative architecture; however, other architectures, structures, and process features and steps can be varied within the scope of the embodiments of the present invention.

Figure 1:
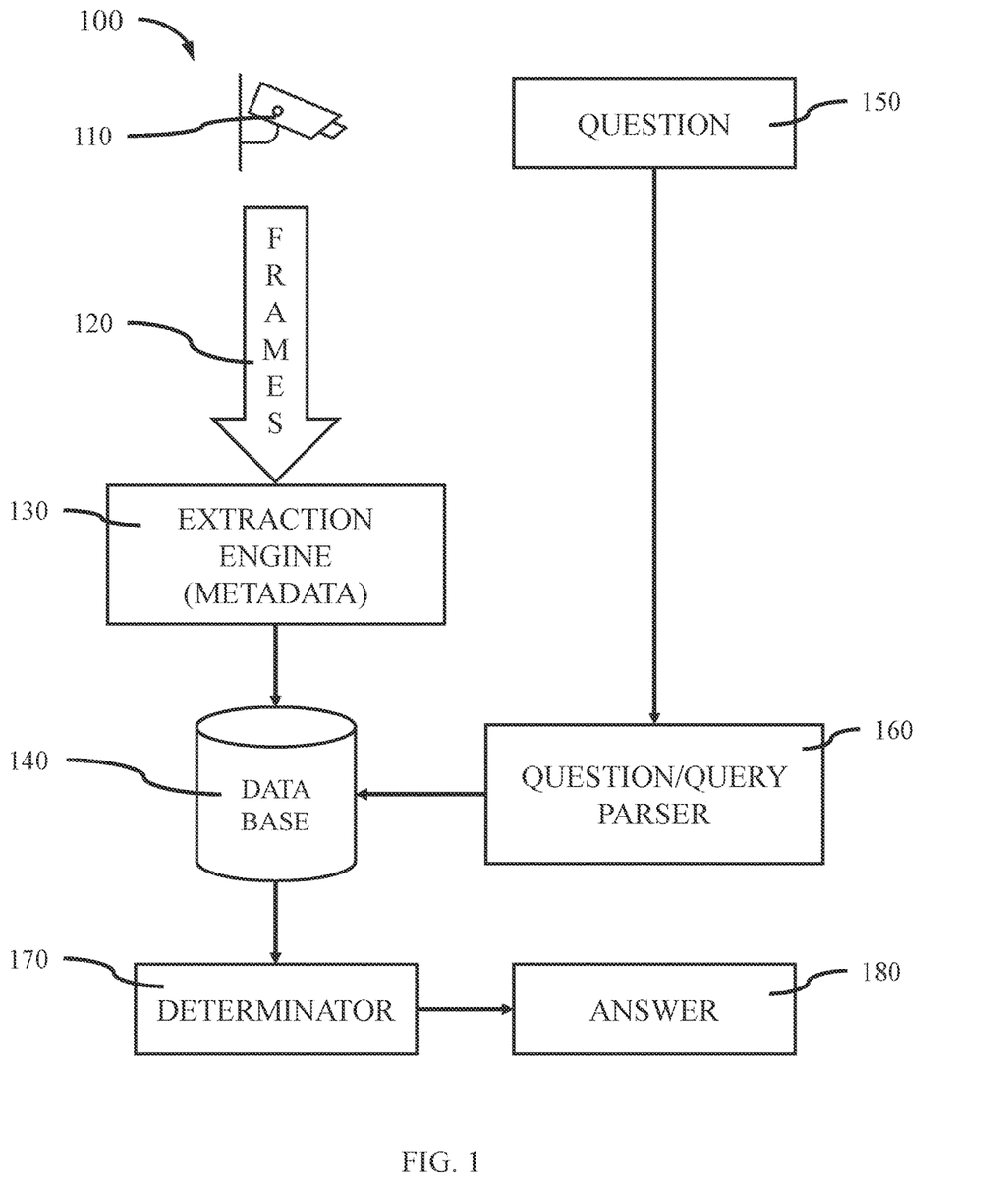
FIG. 1 is a block/flow diagram illustrating a high-level system/method for video analytic query processing, in accordance with an embodiment of the present invention.

Referring now in detail to the figures in which like numerals represent the same or similar elements and initially to FIG. 1, FIG. 1 is a block/flow diagram illustrating a high-level system/method for video analytic query processing, in accordance with an embodiment of the present invention.

In one or more embodiments, a video camera 110 can capture a video made up of a time series of video frames 120, where the video frames can be inputted into an extraction engine 130 that can extract the different features in the video frames, for example, detecting and extracting the position (e.g., x, y, z coordinates), motion (e.g., direction, speed, etc.), physical attributes (e.g., color, size, texture, etc.), and interrelationships (e.g., do they come into contact) of different objects and people contained in the video. Each identified object present in the first frame of a video can have an initial position and/or an initial motion. The video can be made up of a number, N, of individual video frames, and a video rate, for example, 25 frames per second (fps).

In various embodiments, the combination of video frame time stamps, frame rate, and motion can provide temporal relationships and context. The motion of the objects can have a temporal order (e.g., what comes first) and a causal order (e.g., what happened next).

In various embodiments, the video frames 120 can be an array of pixels having a predetermined size, where the pixels of the video frames can include color data, and the video frames can include associated metadata, for example, time stamps, camera ID, location, etc.

In various embodiments, the extraction engine 130 can be a deep neural network (DNN), for example, a convolutional neural network that can be trained to detect and identify different objects and people in the video frames, and determine the behavior (e.g., movement, interrelationships) of the detected objects and people. A CNN can be trained to extract objects from images.

In various embodiments, the information extracted from the video frames 120 by the extraction engine 130 can be stored in a database 140. The database can be computer memory that is configured to store and organize the extracted information, including, but not limited to the position, motion, physical attributes, and interrelationships of the different objects and people contained in the video.

In various embodiments, a user can enter a question 150 into the video analytic query processing system 100, where the user can ask about the features extracted about the objects by the extraction engine 130 and stored in the database 140. The question 150 may be entered through a keyboard or some other device, for example, a microphone/voice recognition system. In various embodiments, the question can be a question about a description of an object in the video, an explanation of an interaction between the objects, a request for a prediction of events subsequent to the end of the video, or a question about a modification to the actions observed in the video. The question about a modification to the actions observed in the video can be a counterfactual assertion, where an object is considered to not be present in the video.

In various embodiments, the question 150 can be fed to a query parser 160 that can analyze the question in relation to the context of the video obtained through the extracted and stored information. The query parser 160 can be a deep neural network, for example, a long short-term memory (LSTM) that has been trained to analyze the language of the question 150 inputted by the user and determine a meaning in view of the contextual framework of the associated video. An LSTM can process the questions and convert them into program commands. In various embodiments, there can be four types of questions, including, descriptive (e.g., 'what color'), explanatory ('what's responsible for'), predictive ('what will happen next'), and counterfactual ('what if'). The LSTM can be pretrained with a word embedding corpus.

In various embodiments, the information from the database 140 and the parsed question from the query parser 160 can be fed into a determinator 170 that compares the parsed question to the available information and determines whether the question can be answered with the available information. The determinator 170 can identify the information needed to answer a question, and search the database 140 for the identified information. The determinator 170 can be configured to provide an answer 180 to the extent that the available information is sufficient to answer the parsed question. The determinator 170 can be a DNN classifier that has been trained to classify the question as answerable or not answerable, and trained to provide an answer 180 when sufficient information is available.

Figure 2:
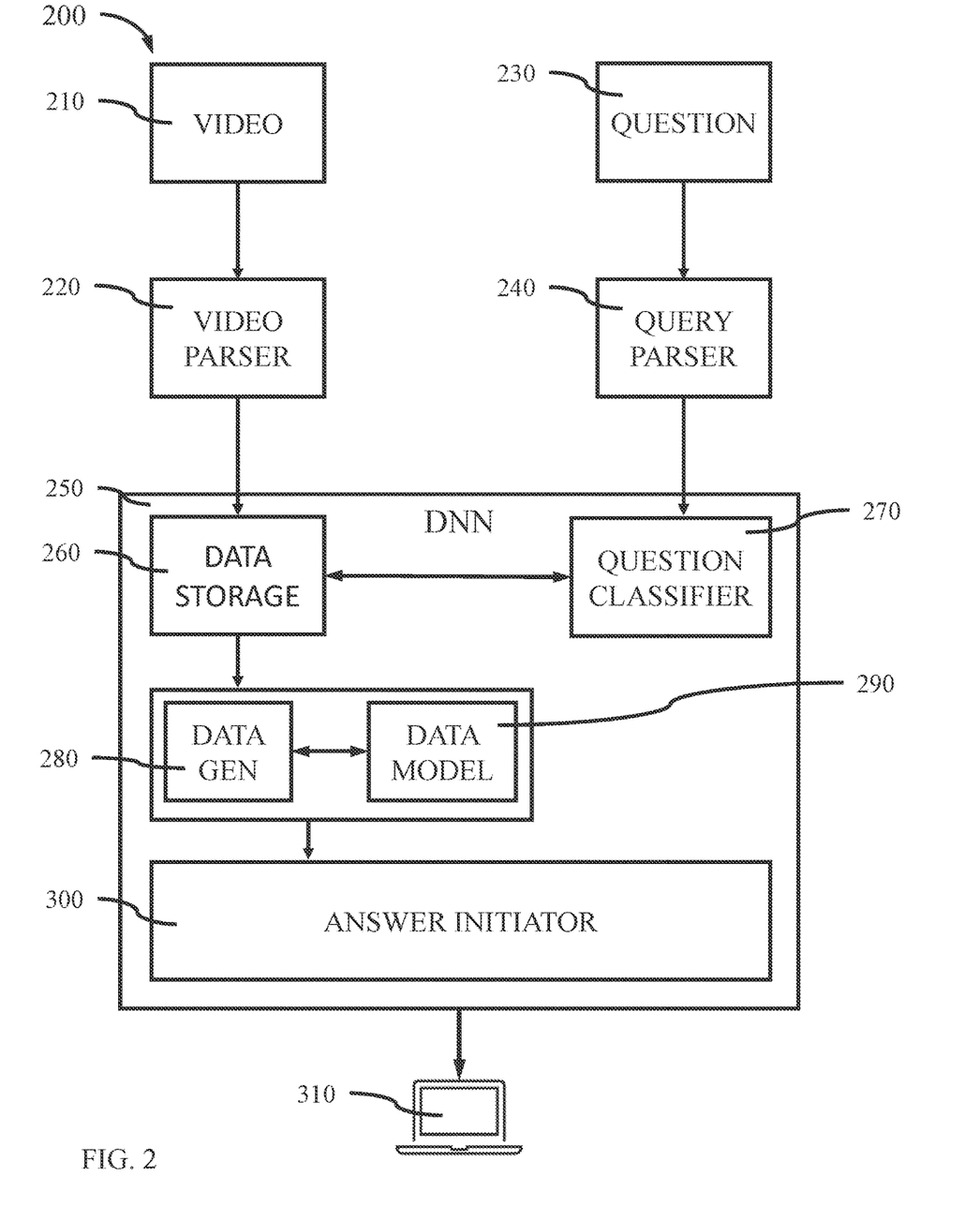
FIG. 2 is a block/flow diagram illustrating a system/method for video analytic query processing with neuro-symbolic artificial intelligence, in accordance with an embodiment of the present invention.

Referring to FIG. 2, is a block/flow diagram illustrating a system/method for video analytic query processing with neuro-symbolic artificial intelligence, in accordance with an embodiment of the present invention.

In one or more embodiments, a video analytic query processing with neuro-symbolic artificial intelligence system 200 can be configured to receive a video and Block 210 is a video, including a sequence of digital video frames, that can be from a video source, for example, a video camera feed. The video, including the digital video frame can be fed into a video parser.

Block 220 is a video parser that can detect and extract various objects and people from the video frames and identify their attributes, for example, color, size, shape, material, texture, vicinity, direction of facing, direction of motion, age, gender, height, race, dress color, etc. of the people detected in the video, etc. In various embodiments, shape can include cube, sphere, cylinder, etc., color can include, red, blue, green, gray, brown, black, purple, and yellow. Material can include rubber, metal, wood, plastic, glass, etc. Texture can include rough or smooth. The video parser 220 can include a convolutional neural network (CNN) that can be trained to detect and identify one or more objects in the digital video frames. The video parser 220 can obtain an object-centric representation of the video frames.

In various embodiments, a convolutional neural network (CNN) can identify and extract objects from the digital images making up the video. The CNN can operate on each of the video frames to identify different objects (including people) and identify their attributes, where the CNN can label the identified objects. The CNN can extract the features from the video based on the pretrained word embeddings, where the objects and events can be associated with the terms of the pretrained word embeddings.

Block 230 is a query interface that can receive questions from a user regarding the objects, people, and actions in the video. The interface allows user of the system to input questions related to one or more videos.

Block 240 is a query parser that includes a collection of algorithms that extract context from the question and also predict a sequence of programs, which are later used to obtain correct answer(s). The programs can be implemented as a collection of neural networks, machine learning algorithms, and/or traditional programs.

In various embodiments, a long short-term memory (LSTM) network can process the questions and convert them into program commands, which can be a sequence of identifications that determine what information a user is asking about and is needed to answer the question. Keywords regarding objects, attributes, and events can be identified by the query parser.

Block 250 is an answer generator that takes in video information from the video parser 220 and information from the query parser 240 and generates an answer to the question.

The answer generator can include Data Storage 260 to store intermediate information about the objects and their attributes in the video, a Question Classifier 270 that is a binary classifier which predicts whether the question requires further modeling of data to gain more information, for example, for motion and events in the video, or it can be answered by the information already stored in the data store 260, a Missing Data Generator 280 that mines for more information in the video stream by modeling the flow of object and attribute information across the sequence of frames of the video, a Frame Data Modeler 290 that is a collection of deep neural network architectures, which learn a joint distribution of objects and attributes, an Answer Initiator 300 that takes input from the Data Store, Question Classifier, Missing Data Generator and Question Parser and executes a series of programs to compute the final answer. The Answer Initiator 300 executes a program on the motion and event traces extracted by the dynamics predictor and output an answer to the question. The Answer Initiator 300 can assemble functional modules (e.g., Python modules or SQL queries) and then iterate through a program tree, that is the sequence of the steps that is executed to generate an answer.

The Question Classifier 270 can identify the information being sought from the query parser and compare the parsed question to the information stored in the Data Storage 260 to determine if each piece of information identified in the question is available in the Data Storage 260.

The Missing Data Generator 280 is configured to provide information about the objects, attributes, motions and events that was not previously available from the Data Storage 260 through modeling of the features in the video. The Missing Data Generator 250 is capable of modeling the flow of object and attribute information across the sequence of frames of a video stream. In order to make a connection between frame information, Missing Data Generator 280 can use recurrence connections.

The question may be answered from the information stored in Data Storage 240, which can be a database. Various machine learning (ML) engines can extract metadata from input frames and save them in Data Storage 260, that can include a database.

The Frame Data Modeler 290 can utilize DNN(s) for dynamic prediction, where the trained DNN(s) can track motion of objects over longer sequence of frames, learn events and identify objects exiting from a scene/frame. A propagation network can learn the physical dynamics from the data extracted by the video parser 220 CNN and predict future object behavior.

The Answer Initiator 300 can be configured to bring together all structured information obtained from the neural networks to compile an answer.

In various embodiments, the answer generated by the Answer Initiator 300 can be presented to the user on a display 310, which can be, for example, a smart device (e.g., smartphone, tablet), a laptop computer, a computer terminal, etc.

Figure 3:
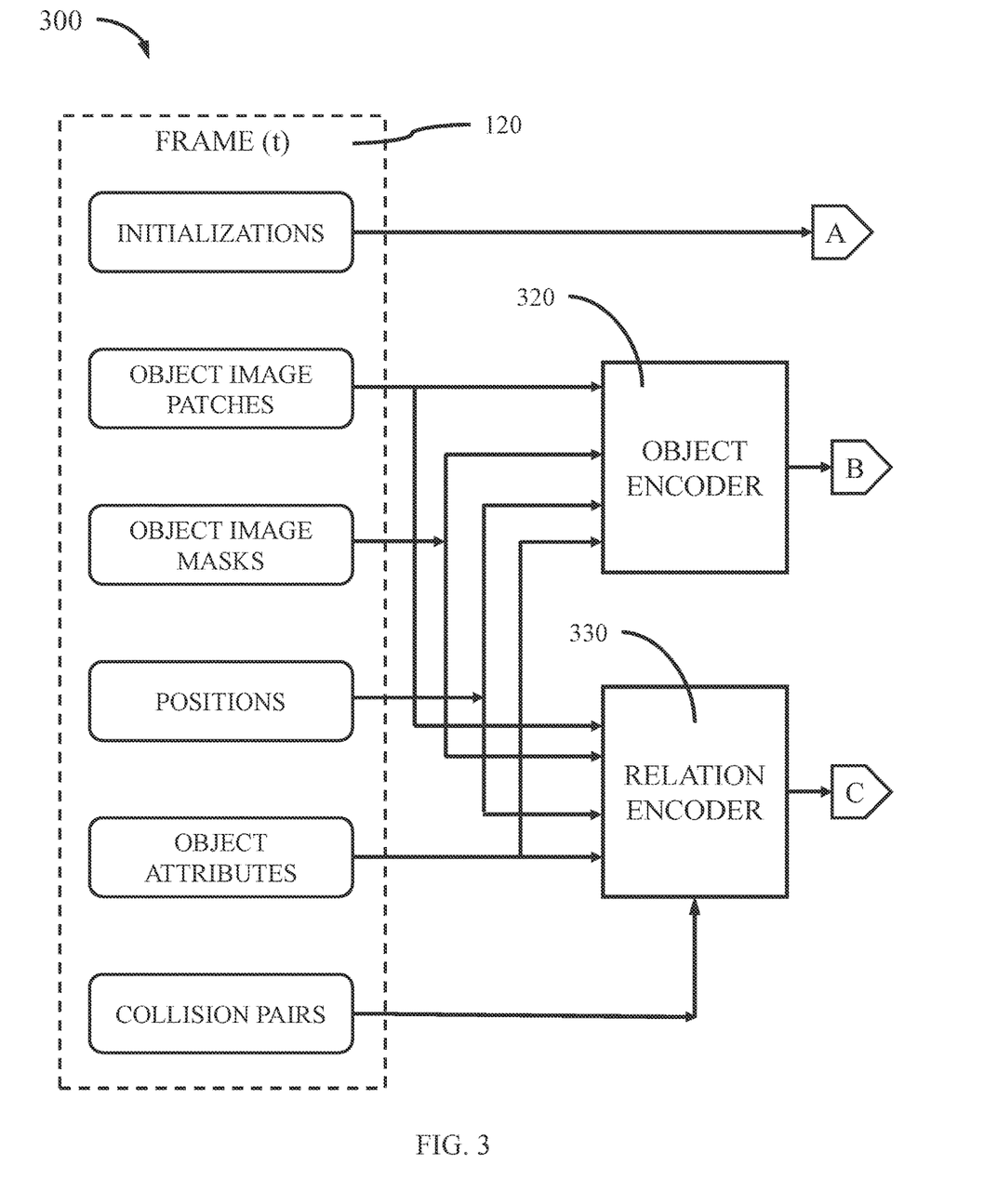
FIG. 3 is a block/flow diagram illustrating a system/method for a propagation network based dynamics predictor, in accordance with an embodiment of the present invention.

FIG. 3 is a diagram showing a Dynamic Predictor, in accordance with an embodiment of the present invention.

In one or more embodiments, the Dynamic Predictor can be a network of six (6) Deep Neural Networks (DNN), where each of the DNNs can perform a different function to generate an answer. The Dynamic Predictor includes a learnable physics engine that performs object- and relation-centric updates on a dynamic scene. A dynamics model can predict the object dynamics under unobserved or counterfactual scenarios.

The Dynamic Predictor can be configured to form a probabilistic model that can identify the motions and interactions of the objects identified in the video frames. The probabilistic models can provide analysis of different scenarios related by the behavior of the objects in the video, where the alteration of the scenario in the video can lead to different possible outcomes. A dynamics model is able to predict the object dynamics under unobserved or counterfactual scenarios. The model learns the dynamics of the objects in the video frames and across the frames for predicting motion traces and collision events. The dynamical system can be modeled as a directed graph, $G=<O, R>$, where the vertices, $O=\{o_i\}$, represent objects and the edges, $R=\{r_k\}$, represent relations.

Each object (vertex) $o_i$ and relation (edge) $r_k$ can be represented as:

$o_i=<s_i, a_i^o>$, $r_k=(u_k, v_k, a_k^r)$; where $s_i$ is the state of object i; $a_i^o$ denotes its intrinsic attributes; $u_k$, $v_k$ are integers denoting the index of the receiver and sender vertices joined by edge $r_k$; $a_k^r$ represents the state of edge $r_k$, indicating whether there is collision between the two objects. $s_i$ is the concatenation of the tuple, $(c_i, m_i, p_i)$, over a small history window to encode motion history, where $c_i$ and $m_i$ are the corresponding image and mask patches cropped at $p_i$, which is the x-y position of the mask in the original image. The patch is the classified object and the mask is the set of pixels associated with the area of the object.

In various embodiments, each video frame can be identified as associated with a particular time, t. The video frame can include initializations, where one object of a plurality of objects is denoted as a reference object, and the position and motion of the other objects are defined in relation to the reference object. Defining the reference objects can fix a base reference point for a frame. An event can be either caused by an object if the event is the first one participated by the object, or another event if the cause event happens right before the outcome event on the same object. For example, if a sphere collides with a cube and then a cylinder, then the first collision and the cube jointly "cause" the second collision. The object motion traces with complex causal structures are generated by the following recursive process. A scenario can start with one randomly initialized moving object, and then another object can be added whose initial position and velocity are set such that it will collide with the first object. The same process is then repeated to add more objects and collisions to the scene. All collision pairs and motion trajectories are randomly chosen. Simulations with repetitive collisions between the same pair of objects can be discarded.

In one or more embodiments, each of the video frames 120 can have a time stamp of a time, t, where the video frames can be in a time sequence. Each of the frames 120 can include initializations, object image patches (labeled object), object image masks pixel area), positions (e.g., x, y or x, y, z) object attributes (e.g., color, shape, etc.), and collision pairs (e.g., vertices (two objects) joined by an edge (interaction/event)). Each frame 120 goes through semantic segmentation network(s) which produces patches and masks.

In one or more embodiments, the object image patches, object image masks, positions, and object attributes can be fed into an object encoder 320. An output can be generated by the object encoder 320, where the Object Encoder 320 generates a vector representation, $D_{enc}$, and outputs a $D_{enc}$-dimensional vector as an object representation. In various embodiments, the Object Encoder 320 can be a convolutional neural network (CNN) that can perform an object encoder function, $f_o^{enc}$, that converts the pixel representation of each object in the video frames into a vector representation recognized by the neural networks for subsequent processing, where an object can initially be an area of a frame with associated values.

In one or more embodiments, the object image patches, object image masks, positions, object attributes, and collision pairs can be fed into a relation encoder 330. An output can be generated by the relation encoder 330, where the relation encoder 320 can perform a relation encoder function, $f_R^{enc}$, that encodes the relationships as a set of numbers identifying the interactions between each pair of objects.

Figure 4:
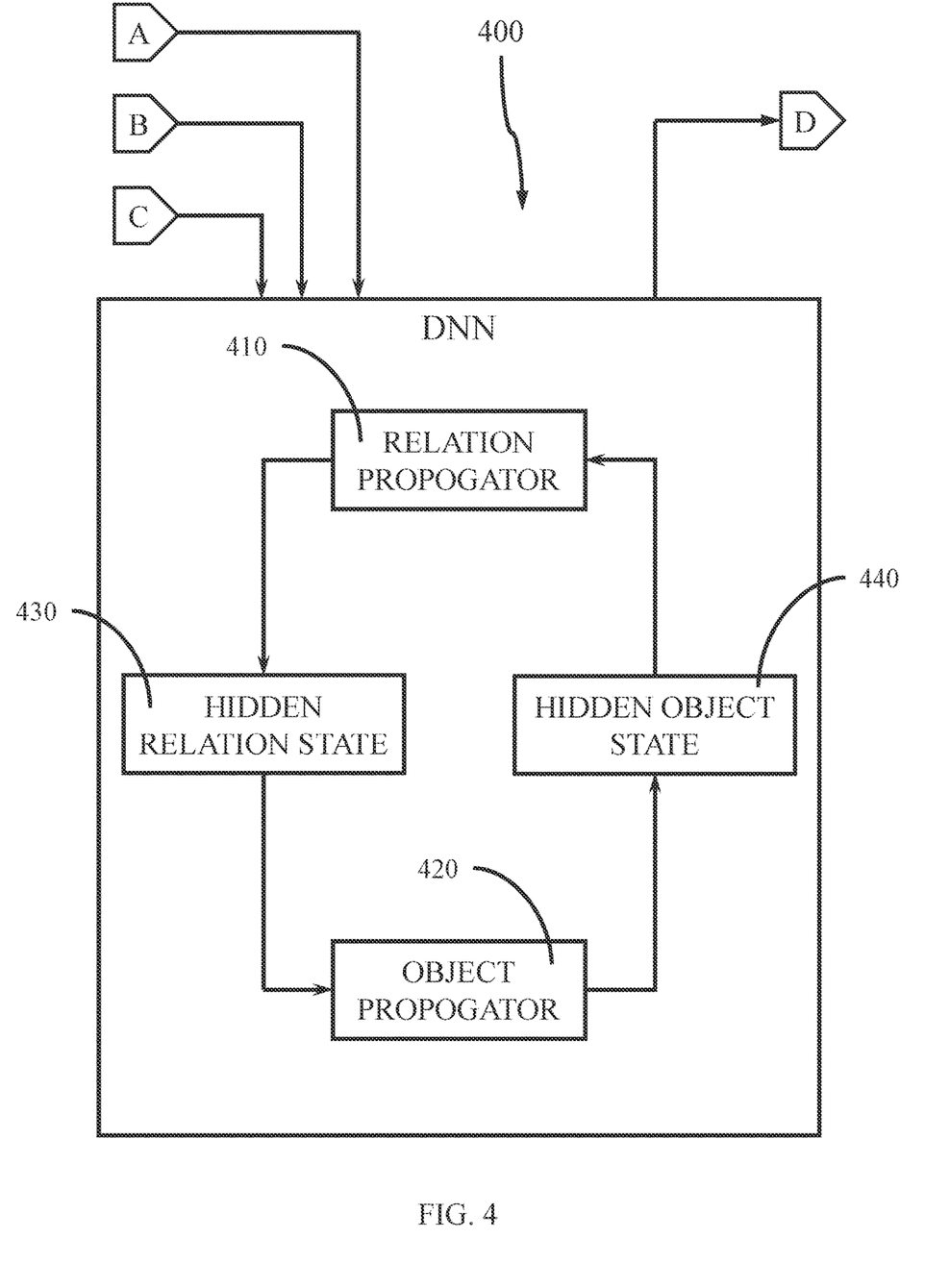
FIG. 4 is a diagram showing recurrent connections and flow for the Dynamic Predictor, in accordance with an embodiment of the present invention.

FIG. 4 is a diagram showing recurrent connections and flow for the Dynamic Predictor, in accordance with an embodiment of the present invention.

Figure 5:
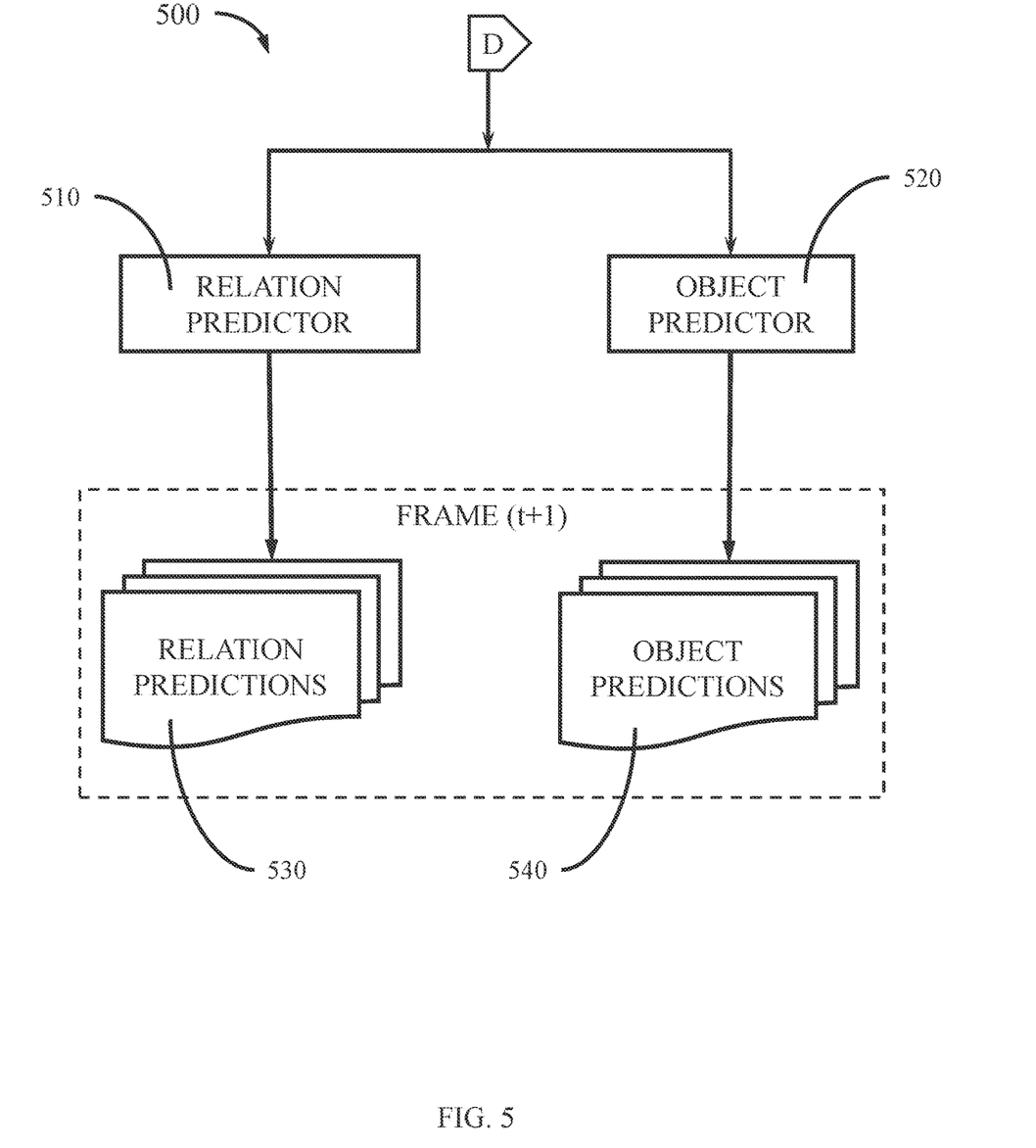
FIG. 5 is a diagram showing a Predictor for the Dynamic Predictor, in accordance with an embodiment of the present invention.

In one or more embodiments, the Propagator 400 can include a Relation Propagator 410 and an Object Propagator 420, which can each be an RNN. The Propagator 400 can learn the physical dynamics from the data extracted by the object encoder 320 and relation encoder 330, and provide information (values) to predict future object behavior. The Propagator 400 can include a Hidden Relation State 430 and a Hidden Object State 440, which are parts of the RNN recurrent neural network. In various embodiments, the Hidden Relation State 430 and Hidden Object State 440 are intermediate values that capture the behavior and the interaction of the objects for sequential transitions between frames in a recurrent neural network, such that the previous and current information is not lost before applying the information to the next video frame. The Hidden Relation State 430 and Hidden Object State can provide intermediate information storage for the Relation Propagator 410 and the Object Propagator 420, so what has been learned about the objects so far (e.g., up to frame, $f_{t-1}$) can be utilized. The Relation Propagator 410 and the Object Propagator 420 can each have a hidden state represented by Hidden Relation State 430 and Hidden Object State 440. The output (D) from the Propagator 400 can be fed into a Predictor 500.

In various embodiments, the Propagator 400 can include the two deep neural networks (DNN), where the Relation Propagator 410 can be an RNN, and the Object Propagator 420 can be an RNN.

The output of the Propagator 400 is the collection of object states and relation states across all the observed and rollout frames.

FIG. 5 is a diagram showing a Predictor for the Dynamic Predictor, in accordance with an embodiment of the present invention.

In various embodiments, the Dynamic Predictor can have a Predictor 500, including two deep neural networks (DNN), a Relation Predictor 510 and an Object Predictor 520. In various embodiments, the Dynamic Predictor can be a combination of six (6) neural networks, including the object encoder 320, relation encoder 330, relation propagator 410, object propagator 420, relation predictor 510, and object predictor 520. The Dynamic Predictor can be trained by minimizing the $L_2$ distance between the predicted $\hat{r}_{k,t+1}$; $\hat{o}_{i,t+1}$ and the real future observation $\hat{r}_{k,t+1}$; $\hat{o}_{i,t+1}$ using stochastic gradient descent. The Dynamic Predictor can generate relation predictions 530 and object predictions 540, which identify future object interactions and object positions.

In various embodiments, the Relation Predictor 510 can be a convolutional neural network (CNN) that can perform a relation predictor function, $f_R^{Pred}$, that predicts the relationship between pair of objects, for example, determines whether two objects will collide or not in the next time step, t+1.

In various embodiments, the Object Predictor 520 can be a convolutional neural network (CNN) that can perform an object predictor function, $f_O^{Pred}$, that predicts the location of objects. Dynamics predictions analyze a series of frames $\{f_1, f_2, \ldots, f_t\}$ and predict what would be the $f_{(t+1)}$.

$\hat{o}_{i,t} = [o_{i,t}; h_t^o]$; where $\hat{o}_{i,t}$ represents vertexes/objects at time t, with index i=1 to I, where I is the number of objects and t is the time, and $h_t^o$ is a hidden state value at time, t, which at time, t=0, can be initially set to 0.

$\hat{a}_{k,t}^r = [a_{k,t}^r; h_t^r]$; where $\hat{a}_{k,t}^r$ is the relation of the object pairs, and $h_t^r$ is a hidden state value at time, t, which at time, t=0, can be initially set to 0.

$c_{i,t}^o = f_o^{enc}(\hat{O}_{i,t})$; $c_{k,t}^r = f_R^{enc}(\hat{O}_{u_k,t}, \hat{O}_{v_k,t}, \hat{a}_{k,t}^r)$ where $c_{i,t}^o$ is an intermediate output value (B) produced by the object encoder 320 that can be fed into the propagator 400 that can be utilized by the object propagator 420, and $c_{k,t}^r$ is an intermediate output value (C) produced by the relation encoder 330 that can be fed into the propagator 400 that can be utilized by the relation propagator 410.

STEP 0:

$z_{i,t} = 0$, i=1 ... |O|; where $z_{i,t}^o$ is an intermediate value of the Object Propagator 420, which can initially be set to zero (0).

STEP l=1 ... L:

$e_{k,t}^l = f_R(c_{k,t}^r, z_{u_k,t}^{l-1}, z_{v_k,t}^{l-1})$, k=1 ... |R|; where $f_R$ denotes the function of the Relation Propagator 410, and $e_{k,t}^l$ is the propagating effect from relation k at time, t; $e_{k,t}^l$ is an intermediate value of the Relation Propagator 410.

propagation step 1.

$z_{i,t}^l = f_O(c_{i,t}^o, \Sigma_{k \in N_i} e_{k,t}^l, z_{i,t}^{l-1})$, i=1 ... |O|; where $f_O$ denotes the function of the Object Propagator 420, and $z_{i,t}^l$ is an intermediate value of the Object Propagator 420.

OUTPUT:

$\hat{r}_{k,t+1} = f_R^{Pred}(c_{k,t}^r, e_{k,t}^L)$, k=1 ... |R|; where R represents edges with index k=1 to K, where K is the number of interactions/relationships, and $\hat{r}_{k,t+1}$ is the predicted future relationship for time, t+1.

$\hat{o}_{i,t+1} = f_O^{Pred}(c_{i,t}^o, h_{i,t}^L)$ i=1 ... |O|; where $f_O^{Pred}$ is a predictive function for the objects, and $\hat{o}_{i,t+1}$ is predicted, and, and $h_{i,t}^l$ is the effect from object i.

The output of the neural dynamics predictor is $\{\hat{O}_t\}_{t=1 \ldots T}, \{\hat{R}_t\}_{t=1 \ldots T}$ the collection of object states and relations across all the observed and rollout frames.

From this representation, one can recover the full motion and event traces of the objects under different rollout conditions and generate a dynamic scene representation of the video. For example, if what will happen if an object is removed from the scene is desired, the corresponding vertex and associated edges for the object can be erased from the graph and rollout using the learned dynamics to obtain the traces.

Figure 6:
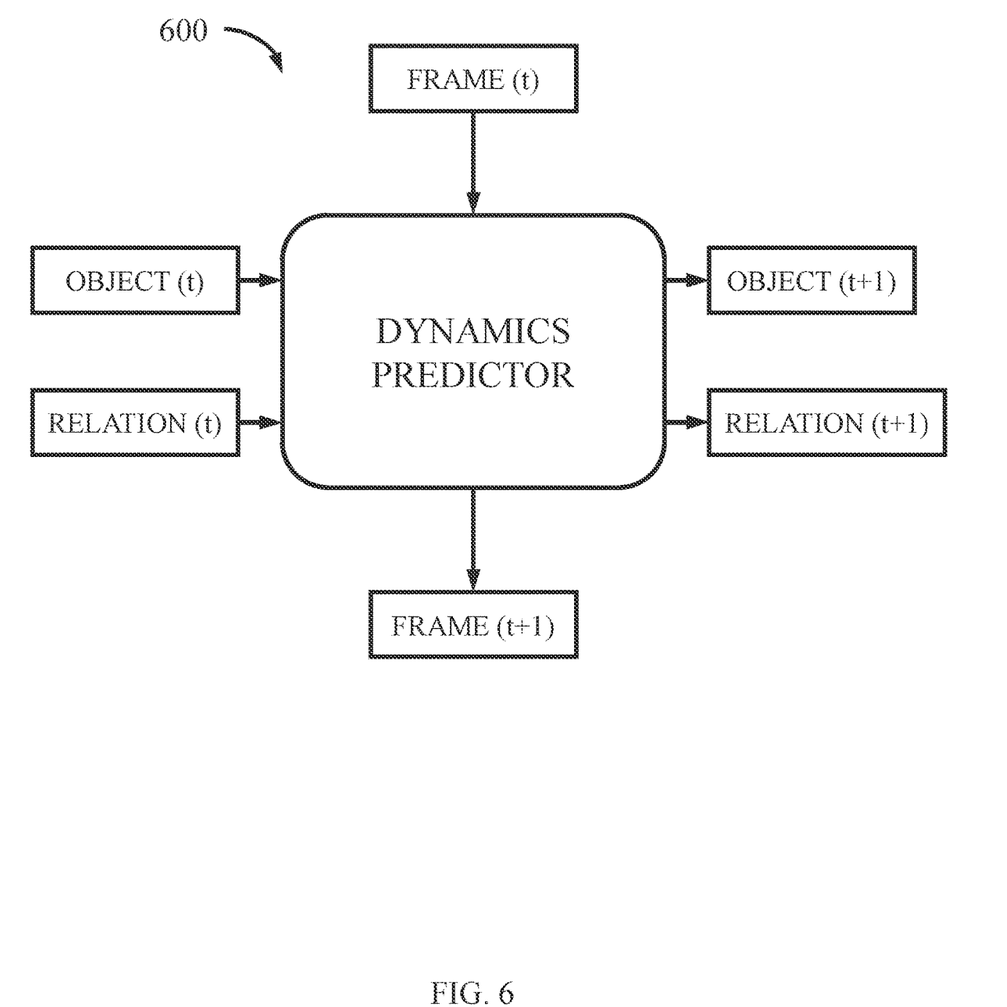
FIG. 6 is a block/flow diagram illustrating a high-level system/method for the Dynamic Predictor, in accordance with an embodiment of the present invention.

FIG. 6 is a block/flow diagram illustrating a high-level system/method for the Dynamic Predictor, in accordance with an embodiment of the present invention.

In one or more embodiments, the Dynamic Predictor 600 can receive Object states and Relationship states at a time, t, which can include hidden object states and hidden relation states from between t=0 and t−1, analyze the objects and relationships in the video frame for time, t, and output predicted Object states and Relation states for a future time, t+1. The predicted Object states and Relation states can include object positions $(x_{t+1}, y_{t+1})$ and interactions $(r_{t+1})$. Recurrent states, $h_t^o$ and $h_t^r$ can be updated.

$$h_{t+1}^r = f_R^H(\hat{a}_{k,t}^r);$$

$$h_{t+1}^o = f_O^H(\hat{o}_{i,t}).$$

In various embodiments, the Dynamic Predictor 600 can include a recurrent neural network (RNN) that works betters for use-cases when from sequence of the inputs, someone tries of predict something.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

Figure 7:
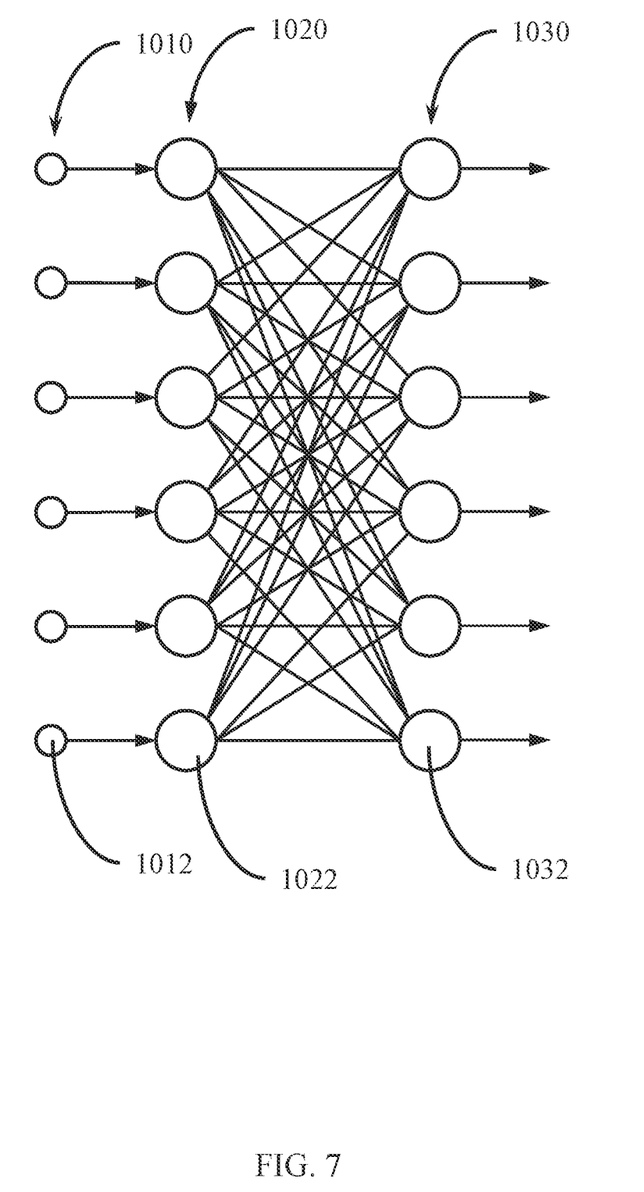
FIG. 7 is a block/flow diagram illustrating a layered neural network, in accordance with an embodiment of the present invention.

FIG. 7 is a block/flow diagram illustrating a layered neural network, in accordance with an embodiment of the present invention.

In layered neural networks, nodes are arranged in the form of layers. A simple neural network has an input layer 1020 of source nodes 1022, a single computation layer 1030 having one or more computation nodes 1032 that also act as output nodes, where there is a single node 1032 for each possible category into which the input example could be classified. An input layer 1020 can have a number of source nodes 1022 equal to the number of data values 1012 in the input data 1010. The data values 1012 in the input data 1010 can be represented as a column vector. Each computational node 1030 in the computation layer generates a linear combination of weighted values from the input data 1010 fed into input nodes 1020, and applies a non-linear activation function that is differentiable to the sum. The simple neural network can perform classification on linearly separable examples (e.g., patterns).

Figure 8:
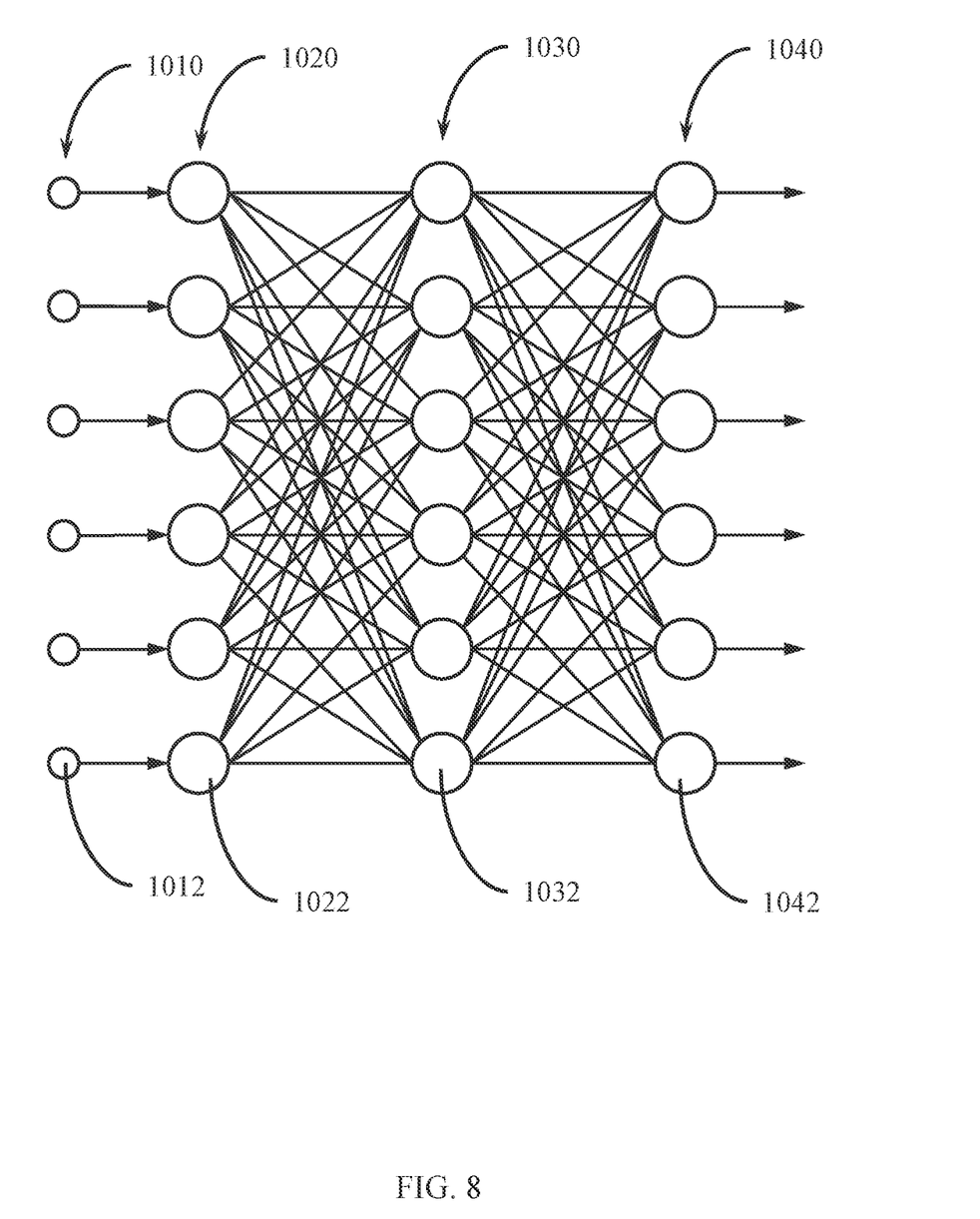
FIG. 8 is a block/flow diagram illustrating a deep neural network, in accordance with an embodiment of the present invention.

FIG. 8 is a block/flow diagram illustrating a deep neural network, in accordance with an embodiment of the present invention.

A deep neural network, also referred to as a multilayer perceptron, has an input layer 1020 of source nodes 1022, one or more computation layer(s) 1030 having one or more computation nodes 1032, and an output layer 1040, where there is a single output node 1042 for each possible category into which the input example could be classified. An input layer 1020 can have a number of source nodes 1022 equal to the number of data values 1012 in the input data 1010. The computation nodes 1032 in the computation layer(s) 1030 can also be referred to as hidden layers because they are between the source nodes 1022 and output node(s) 1042 and not directly observed. Each node 1032, 1042 in a computation layer generates a linear combination of weighted values from the values output from the nodes in a previous layer, and applies a non-linear activation function that is differentiable to the sum. The weights applied to the value from each previous node can be denoted, for example, by $w_1, w_2, \ldots, w_{n-1} w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 1032 in the one or more computation (hidden) layer(s) 1030 perform a nonlinear transformation on the input data 1012 that generates a feature space. The feature space the classes or categories may be more easily separated than in the original data space.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for video analytic processing with neuro-symbolic artificial intelligence, comprising:
    detecting and extracting one or more objects from one or more video frames;
    identifying the attributes associated with each of the one or more objects;
    extracting context from a question;
    compiling a series of inquiries to identify the information needed to answer the question and identify missing information;
    storing intermediate information about the extracted objects and identified attributes;
    determining whether the question requires further modeling of data to obtain missing information;
    mining the one or more video frames for missing information; and
    compiling the intermediate information from the data storage and missing information based on the context of the question to produce a final answer.

2. The method as recited in claim 1, wherein the context is extracted from the question using a long-short term memory.

3. The method as recited in claim 1, further comprising tracking motion of the one or more objects over a total sequence of video frames, and identifying interactions between the one or more objects.

4. The method as recited in claim 3, further comprising determining the physical dynamics of the one or more objects.

5. The method as recited in claim 4, wherein the physical dynamics of the one or more objects are determined by a recurrent neural network.

6. The method as recited in claim 5, further comprising utilizing the physical dynamics of the one or more objects and the identified interactions between the one or more objects to predict future object interactions and object positions.

7. The method as recited in claim 6, further comprising presenting an answer to the question to a user on a display.

8. A system for video analytic processing with neuro-symbolic artificial intelligence, comprising:
    one or more processors;
    computer memory;
    a video parser configured to detect and extract one or more objects from one or more video frames and identify the attributes associated with each of the one or more objects;
    a query parser that includes a collection of algorithms configured to extract context from a question and compile a series of inquiries to identify the information needed to answer the question and identify missing information;
    data storage configured to store intermediate information about the extracted objects and identified attributes;
    a question classifier that is a binary classifier configured to determine whether the question requires further modeling of data to obtain missing information;
    a missing data generator configured to mine the one or more video frames for missing information; and
    an answer initiator configured to compile the intermediate information from the data storage and missing information from the missing data generator, based on the context of the question from the query parser, and execute a series of programs to produce a final answer.

9. The system as recited in claim 8, wherein the query parser is a long-short term memory.

10. The system as recited in claim 8, wherein the video parser is further configured to track the motion of the one or more objects over a total sequence of video frames, and identify interactions between the one or more objects.

11. The system as recited in claim 10, further comprising a relation propagator configured to determine the physical dynamics of the one or more objects.

12. The system as recited in claim 11, wherein the relation propagator is a recurrent neural network.

13. The system as recited in claim 12, further comprising a relation predictor configured to utilize the physical dynamics of the one or more objects and the identified interactions between the one or more objects to predict future object interactions and object positions.

14. The system as recited in claim 13, further comprising a display configured to present an answer to the question to a user.

15. A computer program product embodied in a non-transitory computer readable medium for video analytic processing with neuro-symbolic artificial intelligence, the computer program product comprising:
    program instructions to detect and extract one or more objects from one or more video frames; program instructions to identify the attributes associated with each of the one or more objects; program instructions to extract context from a question; program instructions to compile a series of inquiries to identify the information needed to answer the question and identify missing information;

program instructions to store intermediate information about the extracted objects and identified attributes; program instructions to determine whether the question requires further modeling of data to obtain missing information; program instructions to mine the one or more video frames for missing information; and program instructions to compile the intermediate information from the data storage and missing information based on the context of the question to produce a final answer.

16. The computer program product as recited in claim 15, further comprising program instructions to track motion of the one or more objects over a total sequence of video frames, and identify interactions between the one or more objects.

17. The computer program product as recited in claim 16, further comprising program instructions to determine the physical dynamics of the one or more objects.

18. The computer program product as recited in claim 17, further comprising program instructions to determine the physical dynamics of the one or more objects utilizing a recurrent neural network.

19. The computer program product as recited in claim 18, further comprising program instructions to utilize the physical dynamics of the one or more objects and the identified interactions between the one or more objects to predict future object interactions and object positions.

20. The computer program product as recited in claim 19, further comprising further comprising program instructions to present an answer to the question to a user on a display.

* * * * *